(12) United States Patent
Carlson (10) Patent No.: US 11,002,956 B1
(45) Date of Patent: May 11, 2021

(54) REFRACTIVE LASER COMMUNICATION BEAM DIRECTOR WITH DISPERSION COMPENSATION

(71) Applicant: BAE SYSTEMS Information and Electronic Systems Integration Inc., Nashua, NH (US)

(72) Inventor: Robert T. Carlson, Bedford, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 16/952,589

(22) Filed: Nov. 19, 2020

(51) Int. Cl.
| | |
|---|---|
| G02B 26/08 | (2006.01) |
| G02B 27/00 | (2006.01) |
| H04B 10/572 | (2013.01) |
| H04B 10/50 | (2013.01) |
| G02B 7/18 | (2021.01) |

(52) U.S. Cl.
CPC ......... *G02B 27/0068* (2013.01); *G02B 7/181* (2013.01); *G02B 26/0891* (2013.01); *H04B 10/503* (2013.01); *H04B 10/572* (2013.01)

(58) Field of Classification Search
CPC .......... G02B 27/0068; G02B 7/181; G02B 26/0891; H04B 10/572; H04B 10/503
See application file for complete search history.

(56) References Cited

U.S. PATENT DOCUMENTS

| | | | |
|---|---|---|---|
| 3,284,632 A | 11/1966 | Niblack | |
| 4,199,226 A | 4/1980 | Weber | |
| 4,850,041 A | 7/1989 | Roberts | |
| 4,901,728 A | 2/1990 | Hutchison | |
| 5,060,304 A | 10/1991 | Solinsky | |

(Continued)

FOREIGN PATENT DOCUMENTS

EP    1054558 A1    11/2000

OTHER PUBLICATIONS

Bentz et al, Signal to Noise Ratio (SNR) Enhancement Comparison of Impulse Coding, Mar. 2014, Photonics, All Document. (Year: 2014).

(Continued)

*Primary Examiner* — Euncha P Cherry
(74) *Attorney, Agent, or Firm* — Maine Cernota & Rardin; Scott J. Asmus (57) ABSTRACT

A co-boresight refractive beam director for a full duplex laser communication terminal includes a chromatic beam steering element, such as a two or three prism Risley prism assembly, and a dispersion compensation mechanism (DCM) inserted in either the transmit or receive path. The DCM adjusts a beam direction of either the transmit or receive laser beam to compensate for a pointing difference introduced by the beam steering element due to a difference between the transmit and receive wavelengths. The DCM can include a tip/tilt mirror and actuator, which can be a commercially available FSM assembly. The beam steering element can be temperature stabilized. Position feedback sensors can increase DCM speed and accuracy. The pointing difference can be calculated and/or interpolated from a pre-established look-up table or fitted curve relating pointing differences to transmit and receive frequencies and the pointing direction of the beam steering element.

18 Claims, 8 Drawing Sheets

(56) References Cited

U.S. PATENT DOCUMENTS

| | | |
|---|---|---|
| 5,099,147 A | 3/1992 | Gregor |
| 5,212,594 A | 5/1993 | Jaynes |
| 5,329,395 A | 7/1994 | Endo |
| 5,530,577 A | 6/1996 | Orino |
| 5,594,580 A | 1/1997 | Sakanaka |
| 5,627,669 A | 5/1997 | Orino |
| 5,659,413 A | 8/1997 | Carlson |
| 5,689,354 A | 11/1997 | Orino |
| 5,710,652 A | 1/1998 | Bloom |
| 6,091,528 A | 7/2000 | Kanda |
| 6,175,451 B1 | 1/2001 | Iriyama |
| 6,268,944 B1 | 7/2001 | Szapiel |
| 6,310,707 B1 | 10/2001 | Kawase |
| 6,327,063 B1 | 12/2001 | Rockwell |
| 6,330,092 B1 | 12/2001 | Aronson |
| 6,335,811 B1 | 1/2002 | Sakanaka |
| 6,384,944 B1 | 5/2002 | Takayama |
| 6,389,047 B1 | 5/2002 | Fischer |
| 6,414,773 B1 | 7/2002 | Masuzawa |
| 6,441,938 B1 | 8/2002 | Heflinger |
| 6,493,122 B1 | 12/2002 | Degura |
| 6,577,421 B1 | 6/2003 | Cheng |
| 6,616,352 B1 | 9/2003 | Shigeta |
| 6,717,654 B1 | 4/2004 | Rajchel |
| 6,968,133 B2 | 11/2005 | Sakanaka |
| 7,058,307 B2 | 6/2006 | Sakanaka |
| 7,076,171 B2 | 7/2006 | Ohtsubo |
| 7,277,641 B1 | 10/2007 | Gleckman |
| 7,289,737 B2 | 10/2007 | Ohmuro |
| 7,343,099 B2 | 3/2008 | Wirth |
| 7,346,282 B2 | 3/2008 | Sakanaka |
| 7,450,855 B2 | 11/2008 | Ohmuro |
| 8,417,126 B2 | 4/2013 | Mandai |
| 9,140,901 B2 | 9/2015 | Staver |
| 10,158,427 B2 | 12/2018 | Carlson |
| 10,331,008 B1 | 6/2019 | Tam |
| 2001/0003442 A1 | 6/2001 | Smith |
| 2001/0043379 A1 | 11/2001 | Bloom |
| 2002/0080452 A1 | 6/2002 | Sakanaka |
| 2002/0131121 A1 | 9/2002 | Jeganathan |
| 2002/0196506 A1 | 12/2002 | Graves |
| 2004/0042798 A1 | 3/2004 | Kehr |
| 2004/0081466 A1 | 4/2004 | Walther |
| 2004/0141753 A1 | 7/2004 | Andreu-von Euw |
| 2004/0202472 A1 | 10/2004 | Giles |
| 2004/0262499 A1 | 12/2004 | Martinelli |
| 2005/0141897 A1 | 6/2005 | Takahashi |
| 2006/0088074 A1 | 4/2006 | Johnstone |
| 2007/0031150 A1 | 2/2007 | Fisher |
| 2007/0031151 A1 | 2/2007 | Cunningham |
| 2007/0253053 A1 | 11/2007 | Suzuki |
| 2008/0219579 A1 | 9/2008 | Aksyuk |
| 2009/0237662 A1 | 9/2009 | Chang |
| 2009/0257755 A1 | 10/2009 | Buelow |
| 2011/0181881 A1 | 7/2011 | Mathur |
| 2011/0274432 A1 | 11/2011 | Cunningham |
| 2012/0087500 A1 | 4/2012 | Ukita |
| 2012/0128374 A1 | 5/2012 | Yang |
| 2012/0308239 A1 | 12/2012 | Sheth |
| 2012/0315043 A1 | 12/2012 | Nakagawa |
| 2014/0233958 A1 | 8/2014 | Hulsey |
| 2014/0241729 A1 | 8/2014 | Brooks |
| 2015/0215040 A1* | 7/2015 | Dickson ............ H04B 10/1125 398/131 |
| 2016/0013882 A1 | 1/2016 | Hashimoto |
| 2017/0038258 A1 | 2/2017 | Hegyi |
| 2017/0054499 A1 | 2/2017 | Graves |
| 2017/0055051 A1 | 2/2017 | Mao |
| 2017/0310084 A1 | 10/2017 | Kim |
| 2017/0346564 A1 | 11/2017 | Wiswell |
| 2018/0088280 A1 | 3/2018 | Kim |
| 2018/0106901 A1 | 4/2018 | Frederiksen |
| 2018/0191446 A1 | 7/2018 | Blanks |
| 2019/0052045 A1 | 2/2019 | Metzger |
| 2019/0075281 A1 | 3/2019 | Hall |

OTHER PUBLICATIONS

Notice of Allowance for U.S. Appl. No. 16/720,362, dated Sep. 2, 2020, 13 Pages.

"Basic Polarization Techniques and Devices," Meadowlark Optics, Inc., 2005. 7 Pages.

Notice of Allowance for U.S. Appl. No. 16/894,082, dated Feb. 12, 2020, 23 Pages.

Nakata et al., "Reconfigurable Terahertz Quarter-Wave Plate for Helicity Switching Based on Babinet Inversion of an Anisotropic Checkerboard Metasurface", Apr. 2019, American Physical Society (Year: 2019).

Office Action for U.S. Appl. No. 16/720,362, dated Mar. 18, 2020, 43 Pages.

Office Action for U.S. Appl. No. 17/097,374, dated Dec. 22, 2020, 8 Pages.

* cited by examiner

REFRACTIVE LASER COMMUNICATION BEAM DIRECTOR WITH DISPERSION COMPENSATION

FIELD

The present disclosure relates to laser communications, and more particularly to apparatus and methods for pointing and steering laser communication beams.

BACKGROUND

Due to an explosion in both civilian and military wireless communication, there is a growing need for high speed, reliable, secure, wireless communication of large amounts of data between communicating nodes. It should be noted that the term "wireless" is used throughout this disclosure to refer to any communication that does not depend on a physical link between sender and receiver. Hence, the term "wireless" as used herein excludes fiber optic communication as well as communication over copper wires.

Traditional communication by wireless radio frequencies suffers from several shortcomings, many of which arise from the wide geographic dispersion of typical radio emissions. Even when directional antennae and antenna arrays are used, radio signals are generally disbursed over large geographic areas, causing rapid attenuation of the signal strengths with distance, and also causing the signals to be relatively easy to intercept by unintended receivers. Due to the geographic overlap of radio communication signals, it is typically necessary to assign radio channels to specific frequency bands, which are often in limited supply. Furthermore, it is relatively easy for hostile antagonists to attempt to jam radio communications by transmitting radio signals at high energies that blanket a region of interest.

Laser communication offers an attractive wireless alternative to radio communication, especially when point-to-point communication is required over long distances, because the non-dispersed, extremely directional character of a laser communication beam intrinsically avoids most of the problems that are associated with radio communication. In particular, laser signals experience very little attenuation as a function of distance, because the signal energy remains tightly collimated in a beam. Also, there is no need to assign frequency bands to laser communication users, because interference between laser signal beams is avoided so long as two beams are not directed to the same recipient with very minimal angular separation. And laser communication security is intrinsically high, because interception of and interference with laser communications requires direct interception of a laser communication beam, and/or focusing jamming beams directly at an intended signal receiver.

Full duplex (simultaneous, bi-directional) laser communication can be implemented between terminals in a laser communication network to maximize network connectivity and bandwidth, and minimize handshake overhead. Typically, two laser wavelengths are implemented in each full duplex link between two communicating nodes in a laser communication network, whereby each of the nodes transmits on one of the two wavelengths and receives on the other. The two implemented wavelengths can generally be referred to as a "first" wavelength and a "second" wavelength. However, for simplicity of expression, the two wavelengths that are implemented in a full duplex laser communication link are sometimes referred to herein as the "red" and "blue" wavelengths, although any two wavelengths can be selected, including wavelengths that are not within the visible spectrum.

The two wavelengths of a laser communication link are typically selected such that the receive channel can be isolated from the transmit channel by a factor of 60 to 100 dB or more. In practice, this generally requires a separation between the "red" and "blue" wavelengths of not less than 3.2 nm. In some implementations, each of the message transmitting lasers that are implemented in a full duplex laser communication network is tunable between several, closely spaced wavelengths, thereby allowing the communication links in a laser communication network to be formed using different pairs of "red" and "blue" wavelengths. Generally speaking, however, each of the message transmitting lasers is limited to a group of closely spaced "red" wavelengths" or "blue" wavelengths, and is therefore either a "red" laser or a "blue" laser.

Often, the nodes in a full duplex laser communication network are configured to transmit and receive laser beams having wavelengths in the telecom International Telecommunications Union Dense Wavelength Division Multiplexing (ITU DWDM) 1555 nm band, which spans a range of approximately 1540-1570 nm, thereby enabling the terminals to implement commercial fiber-optic telecommunication devices and infrastructure.

Of course, due to the highly directional nature of laser beams, it is necessary for communicating nodes to precisely align their lasers with each other, and to maintain the alignment over time so as to effectively communicate. Typically, it is inconvenient or impossible to align laser beams by re-orienting the laser communication terminal as a whole, for example by re-orienting an entire satellite, aircraft, or ground station. Accordingly, a laser communication terminal is generally required to implement a beam director that can align the terminal with a remote node, such that transmitted laser beams are precisely directed to the remote node, and laser light received from the remote node is precisely directed onto a signal detector within the terminal. Typically, the initial pointing must be better than 2 milliradians, corresponding to the initial uncertainty volume for pointing the laser beam, with the pointing subsequently reduced by each terminal to just a few microradians.

Often, laser communication terminals implement a "co-boresight" architecture, whereby received laser light and transmitted laser light both pass through the same "shared" beam director. In principle, this co-boresight approach simplifies alignment between a laser communication terminal and a remote node, in that aligning the shared, co-boresight beam director with the remote node serves to align both the transmitted laser beam and the received laser light.

Figure 1A:
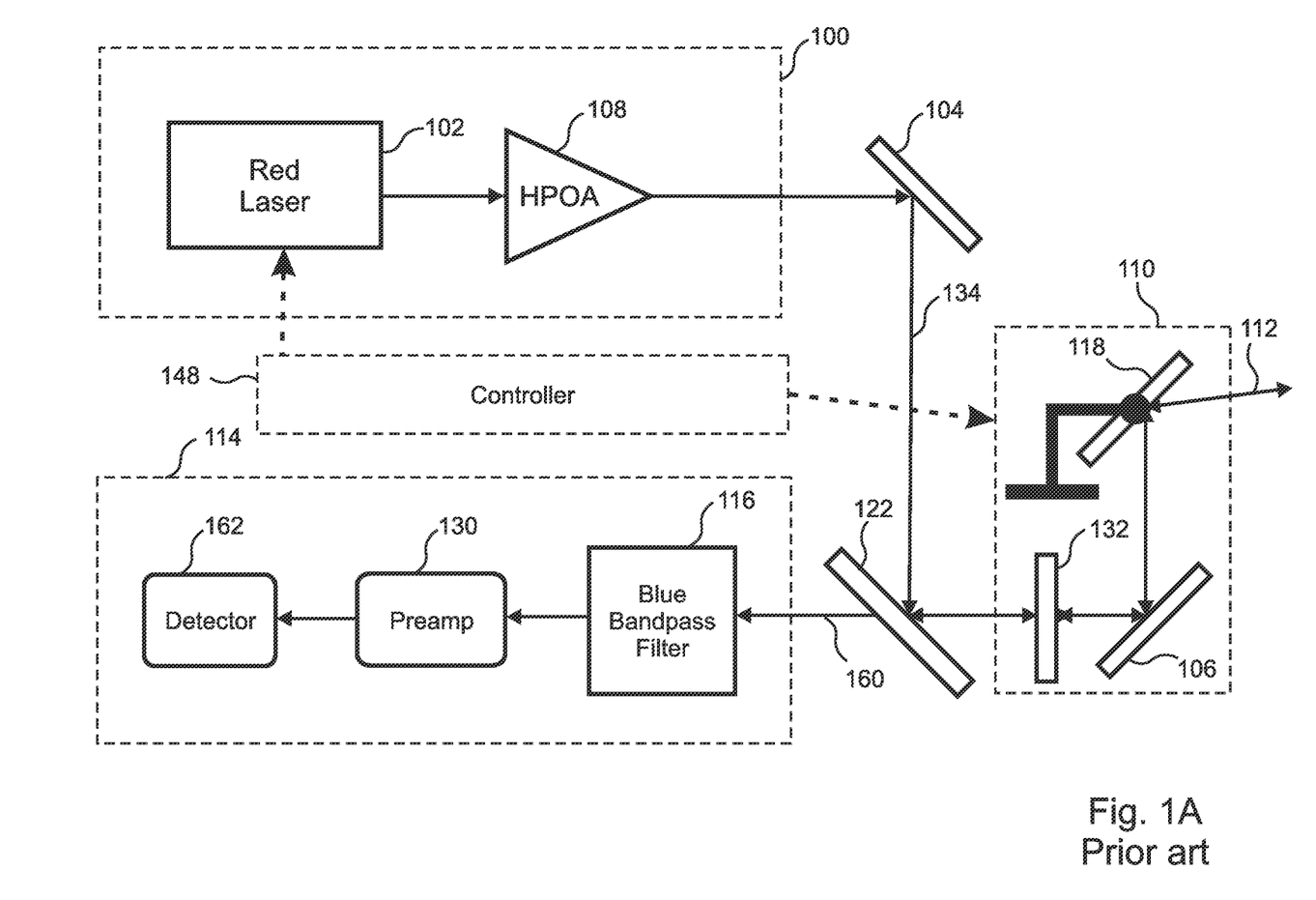
FIG. 1A is block diagram of a full duplex, dual wavelength laser communication terminal of the prior art.

With reference to FIG. 1A, one approach is to implement a mirror 118 in the beam director 110, and to mechanically re-orient the mirror 118 as needed so as to provide alignment with a remote node. FIG. 1A is a simplified block diagram of a "red" laser communication terminal that includes a transmitting section 100, a receiving section 114 and a controller 148. The message transmitting section 100 includes a "red" laser 102 and high-power optical amplifier (HOPA) 108 that generate a transmitted laser communication beam 134 that is linear polarized. The transmitted beam 134 is directed by a mirror 104 to a polarized beam splitter or dichroic filter 122 that functions as a transmit/receive diplexer (TX-RX diplexer) and then into the beam director 110, which includes a quarter wave plate 132 that converts the linear polarized beam into circular polarization, followed by an additional fixed mirror 106 and a mechanically manipulated beam director mirror 118 that directs the transmitted beam 112 to the remote node. "Blue" circular polarized light 112 received from the remote node follows the same path in reverse through the beam director 110, being converted by the quarter wave plate 132 into linear polarized light that passes through the polarized beam splitter or dichroic filter 122 into the receiver 114, which includes a blue bandpass filter 116, a preamplifier 130 and a light detector 162.

While reflective beam directors 110 according to this approach can be effective, they typically consume a considerable amount of space. Also, this approach can be problematic for laser communication by an aircraft, because it can be necessary to implement the beam-directing mirror in a beam deflecting turret that protrudes into the airstream, which can lead to drag and boundary layer turbulence.

Figure 1B:
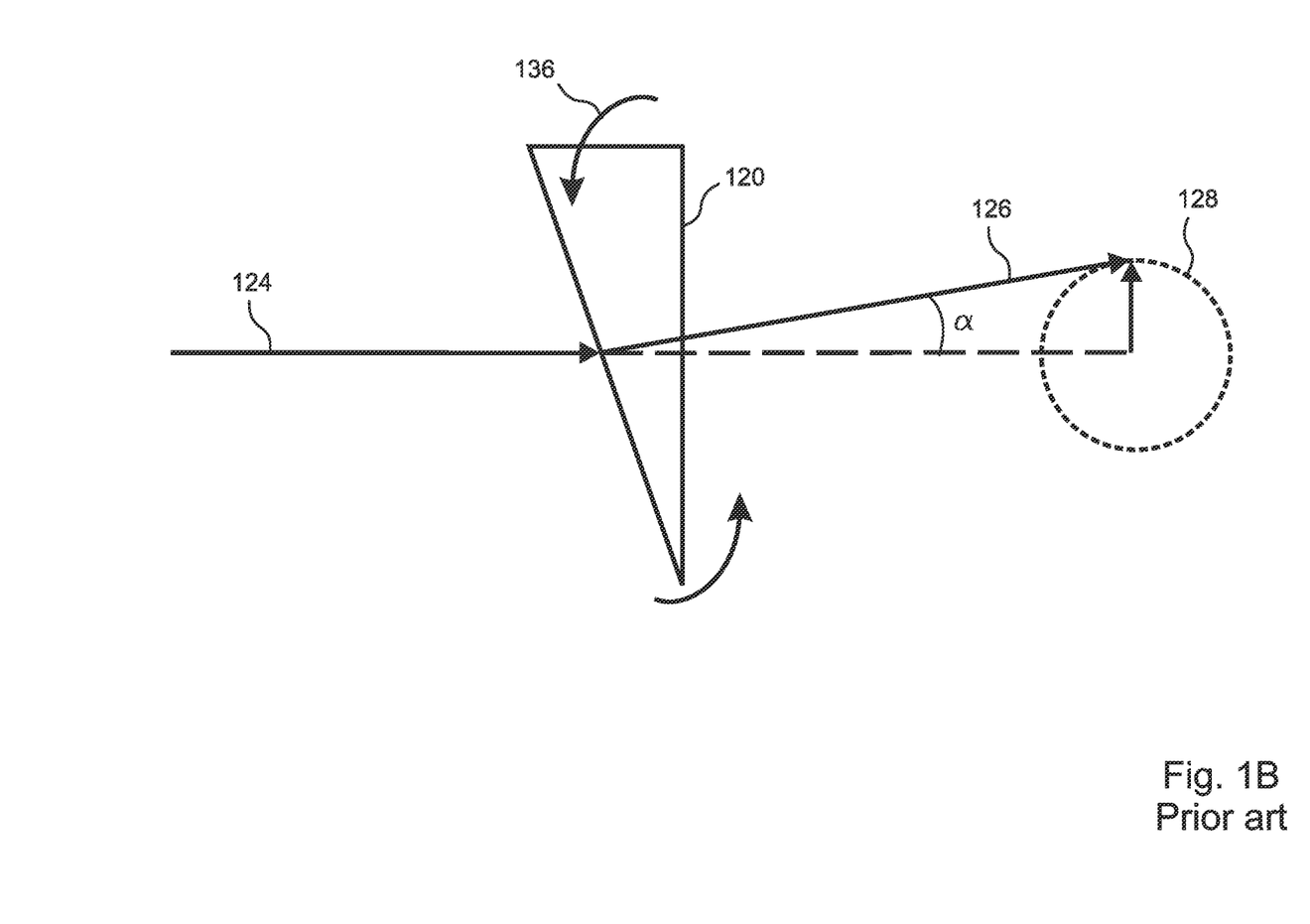
FIG. 1B is simplified diagram that illustrates refraction of a laser beam by a prism, as is known in the art.

Another approach is to implement a refractive beam director, such as a Risley Prism Assembly (RPA). FIG. 1B illustrates refraction by a single prism 120 of an incoming laser beam 124 into an outgoing beam 126, where the two beams 124, 126 differ in direction by an angle a. By rotating 136 the prism 120 about the axis of the incoming beam 124, the direction of the outgoing beam 126 can be changed, with the family of all possible output beams 126 forming a surface of a cone. If the outgoing beam impinges on a target, rotation of the prism 120 causes the impact point of the beam to vary about a circle 128 on the target.

Figures 1C, 1D:
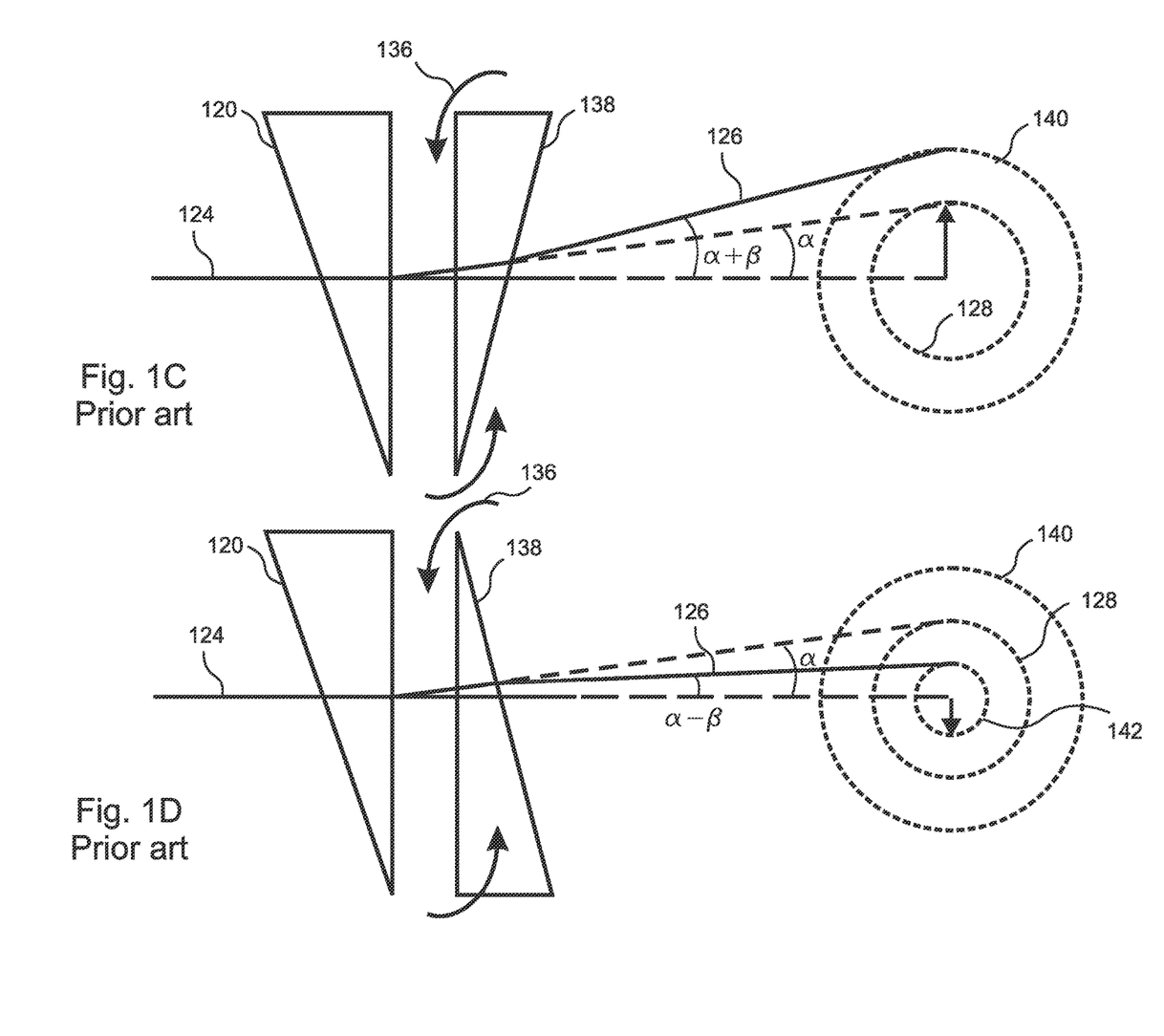
FIG. 1C is a simplified diagram that illustrates refraction of a laser beam at a maximum refraction angle by two rotatable prisms of a Risley prism assembly, as is known in the art.
FIG. 1D is a simplified diagram that illustrates refraction of a laser beam at a minimum refraction angle by two rotatable prisms of a Risley prism assembly, as is known in the art.

Of course, the single, rotatable prism 120 of FIG. 1B is not sufficient by itself to align a laser communication terminal with a remote node. Instead, with reference to FIGS. 1C and 1D, an RPA combines at least two prisms 120, 138 that are both independently rotatable about the axis of the incoming beam 124. In FIG. 1C, the two prisms 120, 138 are aligned such that the refraction of the beam 124 by the two prisms 120, 138 is cumulative, whereby that the total refraction angle is the sum of their separate refraction angles, i.e. a+b. In FIG. 1D the second prism 138 has been rotated such that the refraction of the beam 124 by the two prisms 120, 138 is subtractive, whereby that the total refraction angle is the difference between their separate refraction angles, i.e. a−b.

Figure 1E:
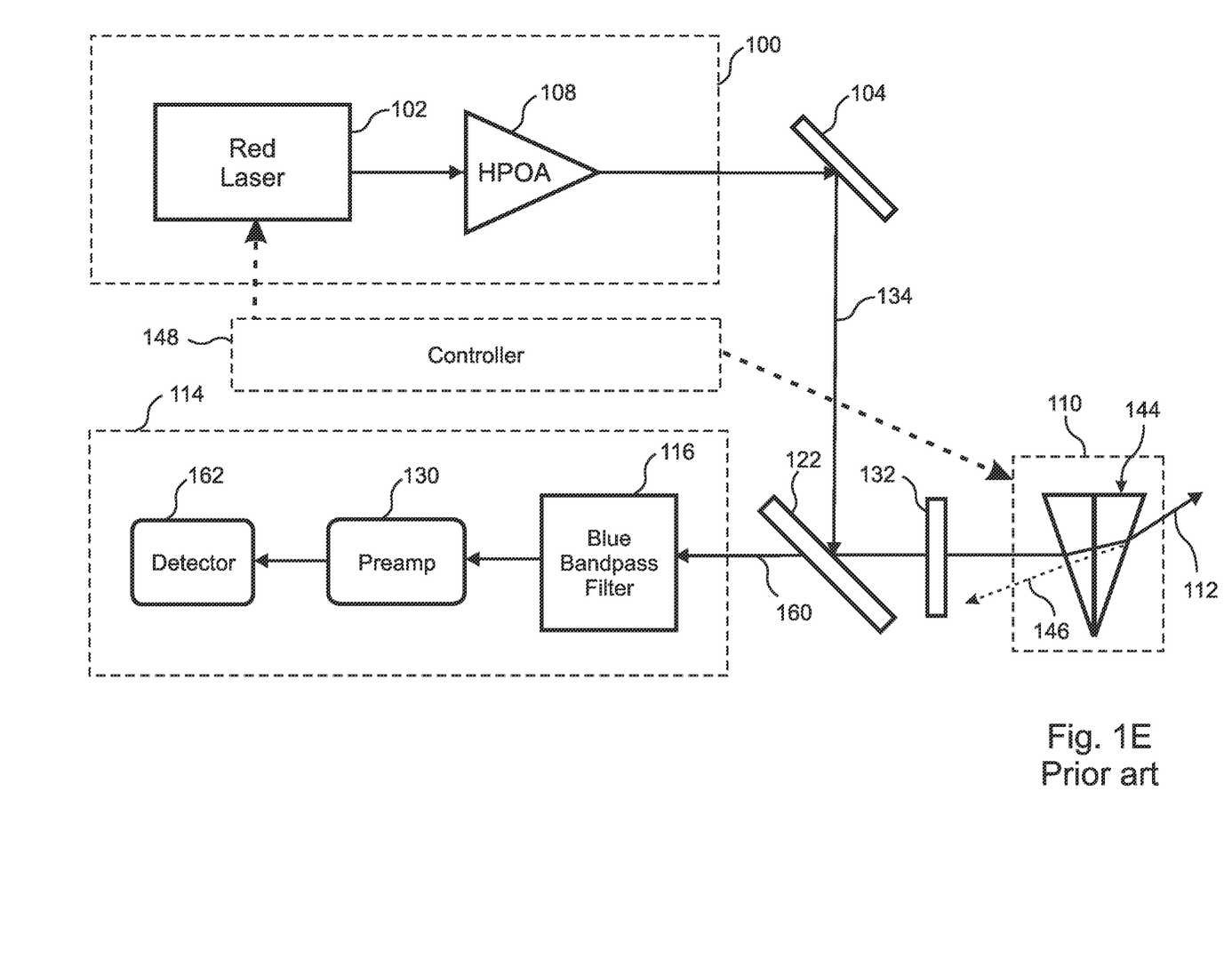
FIG. 1E is a block diagram similar to FIG. 1A, illustrating misalignment of the transmit and receive beams due to implementation of a Risley prism assembly as the beam director according to the prior art.

By rotating both of the prisms 120, 138, the impact point of the outgoing beam 126 on a target can be directed to any point within an annular region bounded by a maximum deflection circle 140 corresponding to a+b and a minimum deflection circle 142 corresponding to a−b. Typically, two prisms 120, 138 having the same dispersion angle a are implemented in an RPA, so that the minimum deflection circle is reduced to a central point, allowing the output beam 126 to be directed to a target anywhere within the disk defined by the maximum deflection circle 140. FIG. 1E is a simplified block diagram of a laser communication terminal similar to FIG. 1A, but in which a simple, 2-prism RPA 144 has been implemented in the beam director 110.

An RPA 144 can be an attractive choice for a beam director 110 in the case of an aircraft, because an RPA 144 can be conformally mounted on the aircraft skin or on a pod surface for optimal aero-optic considerations with minimal boundary layer turbulence. Of course, it can be desirable to use highly refractive materials to form the two prisms 120, 138 of the RPA 144, so as to provide a large maximum deflection angle with minimum size and weight of the RPA. In particular, it can be desirable to form the prisms 120, 138 from optical grade single crystal silicon, which has the highest optical index (circa 3.48) of any glass that can be used for an RPA. By leveraging this high refractive index of silicon, a 120-degree beam-steering cone (60 degree half-angle) can be realized in practice.

However, a simple two-prism RPA 144 as is shown in FIG. 1E may not be acceptable as the beam steering element in a co-boresight full duplex laser communication terminal, especially when the prisms 120, 138 are made from materials having high indices of refraction, because a two-prism RPA 144 is inherently "chromatic," in that the angle by which an incident laser beam 124 is refracted will depend on the wavelength of the laser beam. As noted above, in a full duplex co-boresight laser communication link it is necessary for both the "red" transmitted light and the received "blue" light (or vice versa) to be deflected through precisely the same angle by a "shared" co-boresight beam director 110.

Due to the dependence of the index of refraction on the wavelength of the light for virtually all materials, a simple 2-prism RPA 144 will necessarily refract "red" and "blue" light through slightly different angles, thereby giving rise to a "pointing difference" between the red and blue wavelengths. Accordingly, if a 2-prism RPA 144 in a beam director 110 is configured to precisely direct transmitted "red" light 112 to a remote node, as shown in FIG. 1E, then blue light 146 received from the remote node will be deflected by the RPA 144 through a slightly different angle (exaggerated in FIG. 1E) due to the pointing difference, and will not be properly aligned with the receiver 114 of the laser communication terminal.

Figure 1F:
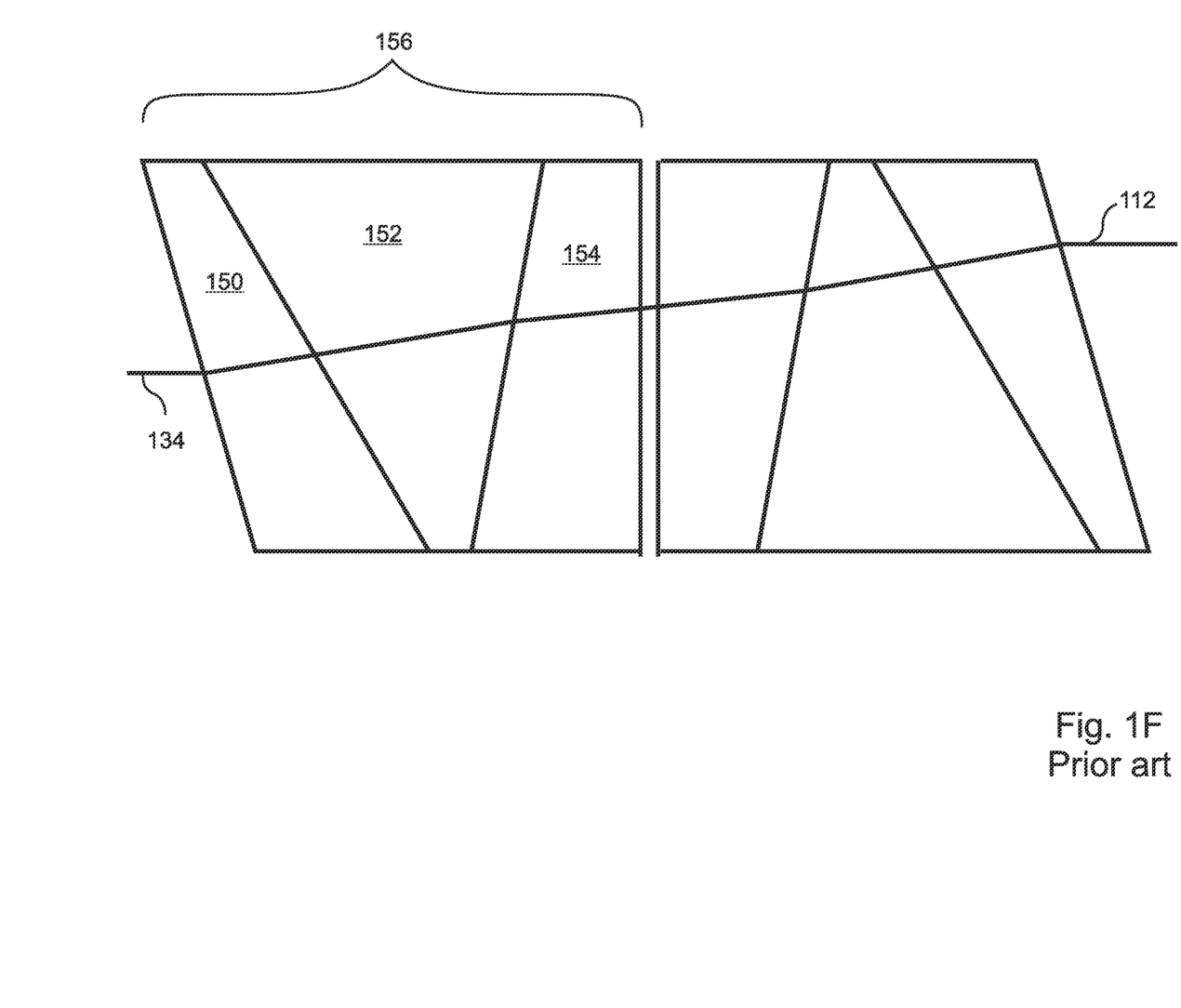
FIG. 1F is a cross sectional illustration of a six-prism achromatic Risley prism assembly of the prior art.

Instead, with reference to FIG. 1F, an achromatic RPA having more than two prisms can be implemented to achieve refraction angles that are substantially independent of wavelength. An example is the achromatic RPA disclosed in U.S. Pat. No. 9,140,941, also by the present Applicant, which is incorporated herein by reference in its entirety for all purposes. In the example of FIG. 1F, the achromatic RPA implements a "pair of triplets" 156 of prisms 150, 152, 154, i.e. six prisms, where each of the "triplets" 156 comprises three prisms 150, 152, 154 that are made from different materials. While effective, an achromatic RPS is physically much thicker, larger, and heavier than equivalent single-material 2-prism RPA's 144 such as in FIGS. 1C-1E, resulting in substantial increase in the size and weight of the beam director 110.

What is needed, therefore, is a compact, lightweight refractive beam director that can be implemented as a co-boresight beam director of a full duplex laser communication terminal that uses different TX and RX wavelengths.

SUMMARY

The present disclosure is a compact, lightweight refractive beam director that can be implemented as a co-boresight beam director of a full duplex laser communication terminal that implements different transmit and receive (TX and RX) wavelengths. The disclosed co-boresight beam director is able to maintain co-boresight alignment of the TX and RX laser beams, in that an angular difference between the TX and RX laser beams while in transit between the laser communication terminal and the remote node is maintained to be less than 100 microradians throughout the beam-steering cone of the refractive beam director.

The TX and RX wavelengths can generally be referred to as a "first" wavelength and a "second" wavelength. However, for simplicity of expression, the two wavelengths that are implemented in a full duplex laser communication link are sometimes referred to herein as the "red" and "blue"

wavelengths, although any two wavelengths can be selected, including wavelengths that are not within the visible spectrum.

The disclosed refractive beam director implements a simple, chromatic refractive beam steering element, such as a 2-prism FPA, in combination with a dispersion compensation mechanism (DCM) that compensates for the transmit red/receive blue (or vice versa) pointing difference of the FPA, i.e. the difference in refraction angle by the FPA of the red and blue light, and thereby permits the disclosed beam director to be implemented as a co-boresight beam director in a full-duplex laser communications terminal.

It will be noted that, for simplicity of expression, the term "RPA" is used in the following to refer to any refractive beam steering device that is chromatic, whether or not it includes a Risley prism assembly, unless otherwise required by context. It will further be noted that while examples and embodiments are presented herein that recite a two-prism RPA as the beam steering element, the scope of the present disclosure extends to all beam directors that implement a chromatic refractive beam steering element, regardless of the number of prisms and/or other optical elements that are included in the beam steering element.

The disclosed DCM implements a small "tip-tilt mirror" having an orientation that is mechanically adjusted by a tip-tilt actuator to compensate for the pointing difference, i.e. the chromatic difference in the beam refraction angles between red and blue light that pass through the RPA. The tip-tilt mirror is inserted into a beam path segment within the terminal that is traversed by one, but not both, of the transmitted and received light, for example in the transmit path or the receive path before they are combined by the TX-RX diplexer. The beam that is adjusted by the DCM tip-tilt mirror is referred to herein as the "compensated" laser beam, and can be either the transmitted laser beam or the received laser beam. The other laser beam, which is not adjusted by the DCM, is referred to as the uncompensated" laser beam.

In embodiments, either two-axis voice coils or piezoelectric drives are implemented in the tip-tilt actuator. Some embodiments implement a commercially available "Fast Steering Mirror" (FSM) assembly as the tip-tilt mirror and actuator in the DCM. Various embodiments provide enhanced speed and accuracy control of the tip-tilt mirror by implementing tip-tilt mirror position feedback sensors, which can include any combination of capacitive sensors, inductive sensors, strain gauges, and/or any other position feedback sensors as are known in the art.

For any given pair of "red" and "blue" wavelengths, the pointing difference that is introduced by the RPA will depend only on the red and blue wavelengths, on the temperature of the RPA, and on the material properties, dimensions, and relative positioning of the optical elements of the RPA, e.g. the rotational orientations of the two prisms in a 2-prism Risley prism assembly. In some embodiments, the temperature of the RPA is monitored, and is included as a variable when determining the pointing difference. In other embodiments, the RPA is temperature stabilized, for example by maintaining the RPA within a temperature regulated enclosure, thereby eliminating temperature effects as a factor in determining the pointing differences. Typically, for a given RPA that is maintained at a constant temperature, the pointing difference will depend only on the two wavelengths and on the pointing angle, i.e. the angle at which the RPA directs the uncompensated laser beam.

According to method embodiments of the present disclosure, each time the RPA is reconfigured to a new pointing direction, a controller determines the red-blue pointing difference for the new pointing direction, and the orientation of the tip-tilt mirror is adjusted to compensate for the pointing difference, thereby providing accurate co-boresight alignment of the transmitted laser beam and the received laser light.

In some embodiments, a "look-up" table or polynomial curve-fit of pointing differences is pre-determined for a specified RPA and for each combination of red and blue wavelengths as a function of the pointing angle and other factors for a plurality of beam directions spanning the field of regard. Based on the look-up table or polynomial fit, the controller is then able to rapidly and accurately determine the applicable pointing difference each time the pointing direction of the RPA is changed, simply by interpolating the correct value from the pre-determined look-up table or extracting the correct value from the curve fit. In some embodiments, the look-up table or curve fit is entirely determined by calculations based on the properties and dimensions of the RPA prisms. In other embodiments, the values in the look-up table or the points used to create the curve fit are determined, or at least verified, based on experimental measurements.

In exemplary embodiments, the difference between the selected "red" and "blue" wavelengths can be between 2 nm and 15 nm. In embodiments, the transmit laser beam within the laser communication terminal is be approximately 1 cm in diameter. And in some of these embodiments, the DCM has a total size of about 2-4 cubic inches.

One general aspect of the present disclosure is a laser communication terminal that includes a transmit channel configured to generate a transmit laser beam at a transmit wavelength to a remote node, a receive channel configured to receive a receive laser beam from the remote node at a receive wavelength that is different from the transmit wavelength, a controller, and a co-boresight beam director that is configured to direct the transmit laser beam to the remote node, and to direct the receive laser beam to the receive channel. The co-boresight beam director includes a beam steering element configured to refract the transmit and receive laser beams, the beam steering element being chromatic, thereby refracting the transmit and receive laser beams through first and second refraction angles respectively according to a difference between the transmit and receive wavelengths, wherein a difference between said first and second refraction angles is referred to herein as a pointing difference, and a dispersion compensation mechanism (DCM) configured to adjust a direction of a compensated laser beam that is one of the transmit and receive laser beams, the other of the transmit and receive laser beams being an uncompensated laser beam. The controller is configured to cause the DCM to adjust the direction of the compensated laser beam so as to compensate for the pointing difference, thereby causing an angular difference between the transmit and receive laser beams, while in transit between the laser communication terminal and the remote node, to be less than 100 microradians.

In embodiments, the beam steering element is a Risley prism assembly. In some of these embodiments the Risley prism assembly is a two-lens Risley prism assembly.

In any of the above embodiments, the beam steering element can include an optical element made of optical grade single crystal silicon.

In any of the above embodiments, the DCM can include a tip/tilt mirror, the tip/tilt mirror being coordinated with a mirror actuator that is able to re-orient the tip/tilt mirror as directed by the controller. In some of these embodiments, the mirror actuator comprises a voice coil and/or a piezoelectric drive. In any of these embodiments, the DCM can be a fast steering mirror assembly. In any of these embodiments, the DCM can include at least one feedback sensor that is configured to sense a position of the tip/tilt mirror about an axis. And in some of these embodiments the at least one feedback sensor is one of a capacitive sensor, an inductive sensor, and a strain gauge.

In any of the above embodiments, the difference between the transmit and receive wavelengths can be between 2 nm and 15 nm. In some of these embodiments the co-boresight beam director is able to cause the transmit and receive laser beams to be parallel with each other to within less than 2 microradians while they are in transit between the laser communication terminal and the remote node.

In any of the above embodiments, the beam steering element can be temperature stabilized.

In any of the above embodiments, the co-boresight beam director can occupy a volume of not more than 4 cubic inches.

A second general aspect of the present disclosure is a method of aligning a laser communication terminal with a remote node. The method includes providing a laser communication terminal according to the first general aspect, adjusting the beam steering element to direct the uncompensated laser beam in a pointing direction, thereby aligning the uncompensated laser beam with the remote node, determining the pointing difference, and causing the DCM to adjust the direction of the compensated laser beam so as to compensate for the pointing difference, thereby causing the transmit and receive laser beams to be parallel and substantially co-linear while in transit between the laser communication terminal and the remote node.

In embodiments, the method further comprises establishing a look-up table containing pointing differences of the beam director as a function of the transmit wavelength, the receive wavelength, and the pointing direction, and wherein determining the pointing difference includes interpolating the pointing difference based on the look-up table. In some of these embodiments establishing the look-up table includes experimentally verifying at least one entry in the look-up table.

And in any of the above embodiments, the method can further include establishing at least one fitted curve relating pointing differences to pointing directions as a function of the transmit wavelength and the receive wavelength, said fitted curves being curves fitted to experimentally measured values.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The present disclosure is a compact, lightweight refractive beam director that can be implemented as a co-boresight beam director of a full duplex laser communication terminal. The disclosed co-boresight beam director is able to maintain co-boresight alignment of the TX and RX laser beams, in that an angular difference between the TX and RX laser beams while in transit between the laser communication terminal and the remote node is maintained to be less than 100 microradians throughout the beam-steering cone of the refractive beam director.

The TX and RX wavelengths can generally be referred to as a "first" wavelength and a "second" wavelength. However, for simplicity of expression, the two wavelengths that are implemented in a full duplex laser communication link are sometimes referred to herein as the "red" and "blue" wavelengths, although any two wavelengths can be selected, including wavelengths that are not within the visible spectrum.

Figure 2:
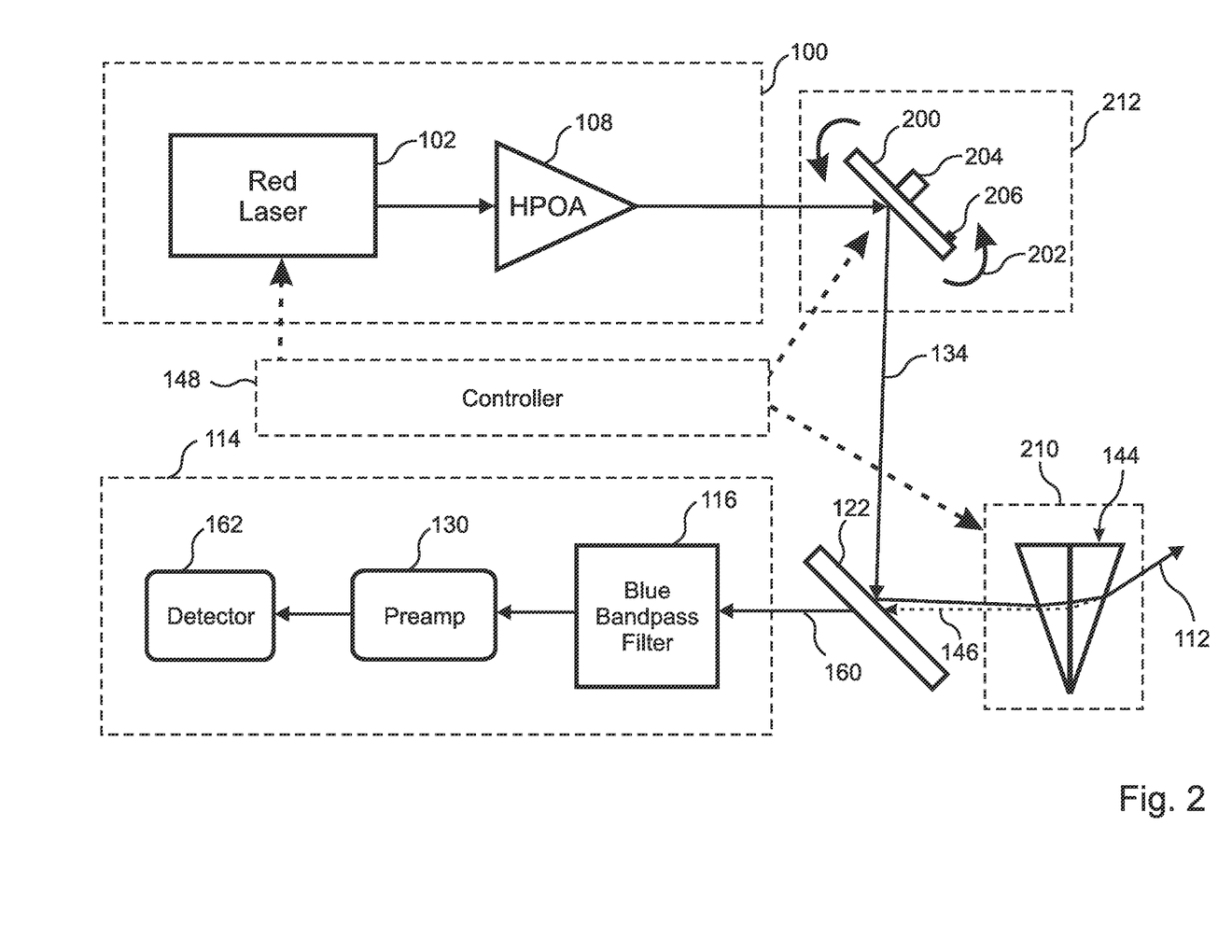
FIG. 2 is a block diagram of a full duplex, dual wavelength laser communication terminal according to an embodiment of the present disclosure.

With reference to FIG. 2, the disclosed refractive beam director 210 implements a simple, chromatic refractive beam steering element 144, such as a 2-prism FPA 144, in combination with a dispersion compensation mechanism (DCM) 212 that compensates for the red/blue pointing difference, i.e. the difference in refraction angle of the red and blue light, and thereby permits the disclosed beam director to be implemented as a co-boresight beam director in a full-duplex laser communications terminal. In embodiments, the RPA 144 is a Risley prism assembly that implements beam-steering wedges made from optical grade silicon as the two prisms. This is because silicon has the highest optical index (circa 3.48) of any glass that can be used for an RPA 144. Embodiments implement a two-prism RPA 144 wherein the two silicon prisms of the Risley prism assembly are able to realize a 120-degree beam-steering cone (60 degree half-angle). Other embodiments use an optical material other than silicon that has a lower refractive index, and hence a correspondingly reduced beam-steering cone, as compared to otherwise identical embodiments that implement silicon prisms.

It will be noted that for simplicity of expression the term "RPA" is used in the following to refer to any refractive beam steering device that is chromatic, whether or not it includes a Risley prism assembly, unless otherwise required by context. It will further be noted that while examples and embodiments are presented herein that recite a two-prism RPA as the beam steering element, the scope of the present disclosure extends to all beam directors that implement a chromatic refractive beam steering element, regardless of the number of prisms and/or other optical elements that are included in the beam steering element.

Figure 3:
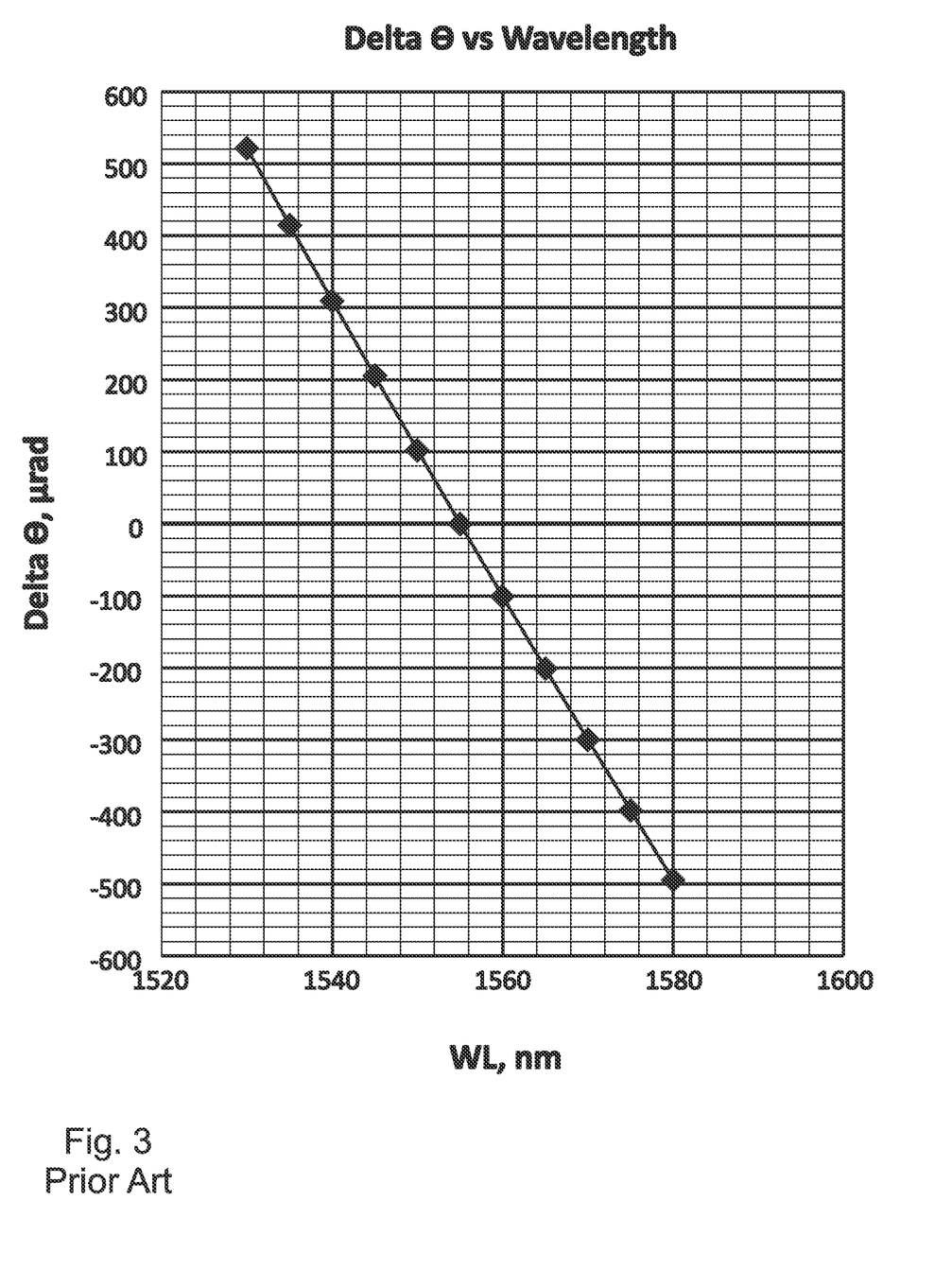
FIG. 3 is a graph that illustrates the dependence of the dispersion angle on wavelength for a single 10.8 degree Risley prism assembly wedge made from optical grade single crystal silicon and configured to deflect an incoming laser beam by a nominal angle of 30 degrees, as is known in the art.

Embodiments leverage existing commercial fiber-optic telecommunications technology by implementing the red and blue wavelengths in the telecom ITU DWDM band in the "1555 nm region," which is approximately between 1540 nm and 1570 nm. In this wavelength region, for a silicon wedge with index of refraction n=3.48, the wedge angle must be 10.8 degrees to provide a 30 degree deflection, and thus realize a 60 degree maximum steering angle with a pair of wedges 120, 138. The dispersion for a single 10.8 degree silicon RPA wedge 120 that deflects 30 degrees is 20 microradians per nanometer, as is indicated in FIG. 3. For a pair of such wedges 120, 138 to realize a maximum deflection of 60 degrees, the dispersion at that maximum angle will be 40 microradians per nm.

Generally, it is necessary for the separation between the TX and RX wavelengths (red and blue wavelengths) to be at least 3.2 nm, so as to allow adequate spectral discrimination. Accordingly, a worst-case pointing difference between TX and RX would be (40 urad/nm)×(3.2 nm)=128 urad for a full deflection of 60 degrees. For an RPA having a nominal aperture size of 50 mm, the refraction-limited beamwidth in the 1555 nm region would then be about 40 urad FWHM, i.e. 20 urad HWHM. Under these exemplary conditions, the DCM residual error must be less than 10 urad to result in a loss of signal of not more than 0.8 dB. At smaller RPA off-axis pointing angles the pointing difference will be less than this 10 urad maximum.

The disclosed DCM implements a small "tip-tilt mirror" 200 having an orientation that is mechanically adjusted 202 by a tip-tilt actuator 202 to compensate for the pointing difference, i.e. the chromatic difference in the beam refraction angles between red and blue light that are introduced by the RPA 144. The tip-tilt mirror 200 is inserted into a beam path segment within the terminal that is traversed by one, but not both, of the transmitted and received light. In the illustrated example, the DCM 212 is inserted in the transmit path 134 before it is combined with the receive path 160 by the TX-RX diplexer 122. The beam that is adjusted by the tip-tilt mirror 200 is referred to herein as the "compensated" laser beam, while the other beam is referred to as the uncompensated" laser beam. In the embodiment of FIG. 2, the transmit beam 134 is the compensated laser beam, while the receive beam 160 is the uncompensated laser beam.

In embodiments, either two-axis voice coils or piezoelectric drives are implemented in the tip-tilt actuator 204. Some embodiments implement a commercially available "Fast Steering Mirror" (FSM) assembly as the tip-tilt mirror 200 and actuator 204 in the DCM. Various embodiments provide enhanced speed and accuracy control of the tip-tilt mirror by implementing tip-tilt mirror position feedback sensors 206, which can include any combination of capacitive sensors, inductive sensors, strain gauges, and/or any other position feedback sensors as are known in the art.

For laser communication links that implement red and blue wavelengths that are separated, for example, by between 2 and 15 nm, and for a terminal having a transmit laser beam diameter of approximately 1 cm, a reflective tip-tilt DCM 212 having a total volume of only 2-4 cubic inches can be realized.

For any given pair of "red" and "blue" wavelengths, the pointing difference that is introduced by the RPA 144 will depend only on the red and blue wavelengths, on the temperature of the RPA 144, and on the material properties, dimensions, and relative positioning of the optical elements of the RPA 144, e.g. the rotational orientations of the RPA prisms (e.g. 120, 138 in the 2-prism Risley prism assembly of FIGS. 1C and 1D. In embodiments, the RPA 144 temperature is monitored, and is included as a variable when determining the pointing difference. In other embodiments, the RPA 144 is temperature stabilized, for example by maintaining the RPA within a temperature regulated enclosure, thereby eliminating temperature effects as a factor in determining the pointing differences. Typically, for a given RPA 144 that is maintained at a constant temperature, the pointing difference will depend only on the red and blue wavelengths and on the pointing angle, i.e. the angle at which the RPA 144 directs the uncompensated laser beam 146.

In some embodiments, a "look-up" table of pointing differences is pre-determined for a specified RPA and for each red/blue wavelength pair as a function of the pointing angle for a plurality of beam directions spanning the field of regard. In other embodiments, a fitted curve representing the pointing difference as a function of the pointing angle is pre-determined. In still other embodiments, a set of mathematical equations is/are provided that enable calculation of the pointing difference according to the pointing direction and other factors. Based on the look-up table, the fitted curve, and/or the equations, the controller is then able to rapidly and accurately determine the applicable pointing difference each time the pointing direction of the RPA is changed, simply by interpolating and/or calculating the correct value from the pre-determined look-up table, fitted curve, and/or equations. In some embodiments, the look-up table is entirely determined by calculations based on the properties and dimensions of the RPA prisms. In other embodiments, the values in the look-up table and/or the values that are fitted to obtain the fitted curve are determined, or at least verified, based on experimental measurements.

Figure 4:
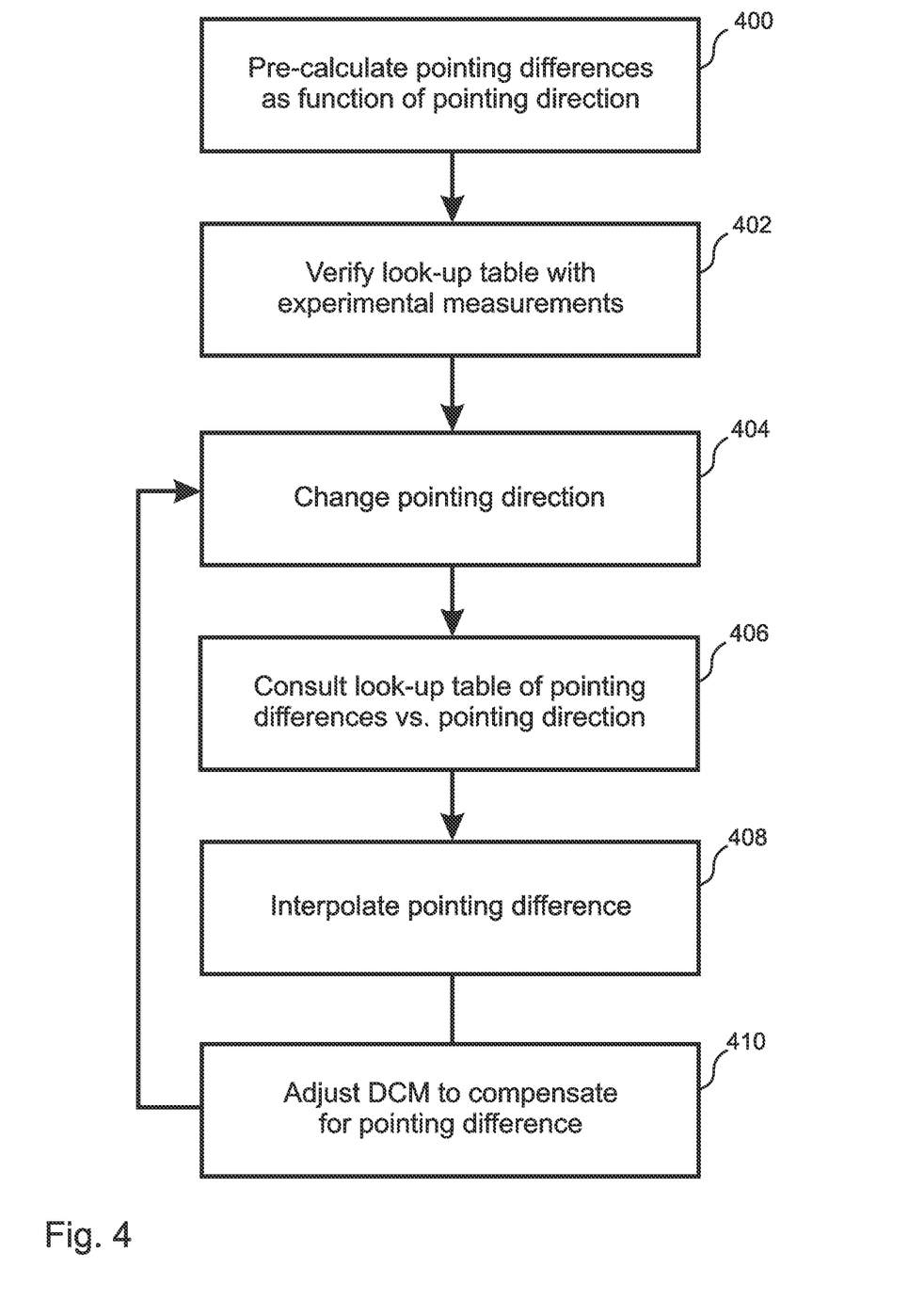
FIG. 4 is a flow diagram that illustrates a method embodiment of the present disclosure.

With reference to FIG. 4, method embodiments of the present disclosure include predetermining the pointing differences as a function of pointing direction for a given RPA 144 and pair of red/blue wavelengths. These can be calculated 400, and then verified 402 by measurements. Subsequently, each time the RPA 144 is reconfigured to a new pointing direction 404, a controller 148 determines the pointing difference for the new pointing direction by consulting the previously determined pointing differences 406, as recorded for example in a look-up table or fitted curve, and then interpolating 408 the pointing difference from the values in the table or curve fit. In other embodiments, the pointing difference is calculated according to previously determined formulae. The orientation of the tip-tilt mirror is then adjusted 410 to compensate the beam director (210, 212) for the pointing difference, thereby providing accurate co-boresight alignment of the transmitted laser beam 134 and the received laser light 160.

The foregoing description of the embodiments of the disclosure has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the disclosure to the precise form disclosed. Many modifications and variations are possible in light of this disclosure.

Although the present application is shown in a limited number of forms, the scope of the disclosure is not limited to just these forms, but is amenable to various changes and modifications without departing from the spirit thereof. The disclosure presented herein does not explicitly disclose all possible combinations of features that fall within the scope of the disclosure. The features disclosed herein for the various embodiments can generally be interchanged and combined into any combinations that are not self-contradictory without departing from the scope of the disclosure. In particular, the limitations presented in dependent claims below can be combined with their corresponding independent claims in any number and in any order without departing from the scope of this disclosure, unless the dependent claims are logically incompatible with each other.

I claim:

1. A laser communication terminal comprising:
a transmit channel configured to generate a transmit laser beam at a transmit wavelength to a remote node;
a receive channel configured to receive a receive laser beam from the remote node at a receive wavelength that is different from the transmit wavelength;
a controller; and
a co-boresight beam director that is configured to direct the transmit laser beam to the remote node, and to direct the receive laser beam to the receive channel;
wherein the co-boresight beam director comprises:
a beam steering element configured to refract the transmit and receive laser beams, the beam steering element being chromatic, thereby refracting the transmit and receive laser beams through first and second refraction angles respectively according to a difference between the transmit and receive wavelengths, wherein a difference between said first and second refraction angles is referred to herein as a pointing difference; and
a dispersion compensation mechanism (DCM) configured to adjust a direction of a compensated laser beam that is one of the transmit and receive laser beams, the other of the transmit and receive laser beams being an uncompensated laser beam;
and wherein the controller is configured to cause the DCM to adjust the direction of the compensated laser beam so as to compensate for the pointing difference, thereby causing an angular difference between the transmit and receive laser beams, while in transit between the laser communication terminal and the remote node, to be less than 100 microradians.

2. The laser communication terminal of claim 1, wherein the beam steering element is a Risley prism assembly.

3. The laser communication terminal of claim 2, wherein the Risley prism assembly is a two-lens Risley prism assembly.

4. The laser communication terminal of claim 1, wherein the beam steering element comprises an optical element made of optical grade single crystal silicon.

5. The laser communication terminal of claim 1, wherein the DCM comprises a tip/tilt mirror, the tip/tilt mirror being coordinated with a mirror actuator that is able to re-orient the tip/tilt mirror as directed by the controller.

6. The laser communication terminal of claim 5, wherein the mirror actuator comprises a voice coil.

7. The laser communication terminal of claim 5, wherein the mirror actuator comprises a piezo-electric drive.

8. The laser communication terminal of claim 5, wherein the DCM is a fast steering mirror assembly.

9. The laser communication terminal of claim 5, wherein the DCM comprises at least one feedback sensor that is configured to sense a position of the tip/tilt mirror about an axis.

10. The laser communication terminal of claim 9, wherein the at least one feedback sensor is one of a capacitive sensor, an inductive sensor, and a strain gauge.

11. The laser communication terminal of claim 1, wherein the difference between the transmit and receive wavelengths is between 2 nm and 15 nm.

12. The laser communication terminal of claim 11, wherein the co-boresight beam director is able to cause the transmit and receive laser beams to be parallel with each other to within less than 2 microradians while they are in transit between the laser communication terminal and the remote node.

13. The laser communication terminal of claim 1, wherein the beam steering element is temperature stabilized.

14. The laser communication terminal of claim 1, wherein the co-boresight beam director occupies a volume of not more than 4 cubic inches.

15. A method of aligning a laser communication terminal with a remote node, the method comprising:
providing a laser communication terminal according to claim 1;
adjusting the beam steering element to direct the uncompensated laser beam in a pointing direction, thereby aligning the uncompensated laser beam with the remote node;
determining the pointing difference; and
causing the DCM to adjust the direction of the compensated laser beam so as to compensate for the pointing difference, thereby causing the transmit and receive laser beams to be parallel and substantially co-linear while in transit between the laser communication terminal and the remote node.

16. The method of claim 15, wherein the method further comprises establishing a look-up table containing pointing differences of the beam director as a function of the transmit wavelength, the receive wavelength, and the pointing direction, and wherein determining the pointing difference includes interpolating the pointing difference based on the look-up table.

17. The method of claim 16, wherein establishing the look-up table includes experimentally verifying at least one entry in the look-up table.

18. The method of claim 15, wherein the method further comprises establishing at least one fitted curve relating pointing differences to pointing directions as a function of the transmit wavelength and the receive wavelength, said fitted curves being curves fitted to experimentally measured values.

* * * * *